(12) United States Patent
Belenkii

(10) Patent No.: US 8,279,287 B2
(45) Date of Patent: Oct. 2, 2012

(54) PASSIVE CROSSWIND PROFILER

(75) Inventor: Mikhail Belenkii, San Diego, CA (US)

(73) Assignee: Trex Enterprises Corp, San Diego, CA (US)

( * ) Notice: Subject to any disclaimer, the term of this patent is extended or adjusted under 35 U.S.C. 154(b) by 471 days.

(21) Appl. No.: 12/228,553

(22) Filed: Aug. 13, 2008

(65) Prior Publication Data

US 2010/0128136 A1 May 27, 2010

Related U.S. Application Data

(60) Provisional application No. 60/964,457, filed on Aug. 13, 2008.

(51) Int. Cl.
*H04N 9/04* (2006.01)
*H04N 5/232* (2006.01)

(52) U.S. Cl. .................................. 348/207.99; 348/345

(58) Field of Classification Search .............. 348/42–43, 348/47–48, 222.1, 294, 345, 207.99; 382/154; 359/407

See application file for complete search history.

(56) References Cited

U.S. PATENT DOCUMENTS 5,469,250 A * 11/1995 Holmes ........................... 356/28
6,118,475 A * 9/2000 Iijima et al. ..................... 348/42
7,831,088 B2 * 11/2010 Frakes et al. .................. 382/154

* cited by examiner

*Primary Examiner* — Trung Diep
(74) *Attorney, Agent, or Firm* — John R. Ross

(57) ABSTRACT

A passive optical crosswind profiling system. The system includes at least one telescope defining two apertures separated at a distance and adapted to collect light along at least two separate paths from a field of view containing a target and at least one high-speed digital camera defining at least one many pixel sensor wherein pixels of said at least one many pixel sensor are identified as separate blocks of pixels. The system further includes an optical system for focusing light collected along said at least two separate paths by said at least one telescope onto said at least one many pixel sensor to produce at least two images of the target scene and a high-speed computer processor programmed to with a special block matching correlation algorithm to correlate image data collected the separate blocks of pixels in order to calculate a crosswind profile along a path between said system and said target.

5 Claims, 10 Drawing Sheets

1) Telescope

2) Optical Bench

3) Precision Aiming Bench

10) Support Superstructure

1) Telescope
2) Optical Bench
9) Precision Aiming Bench
10) Support Superstructure FIG. 6 Hit Points: 750m Range, Day Time
1s Integration Time, LOS Measurements FIG. 8 Time Series of Hit Point Differences: 7/31/08 – 750m Range, 1s Integration Time

PASSIVE CROSSWIND PROFILER

CROSS REFERENCE TO RELATED APPLICATIONS

This application claims the benefit of Provisional Patent Application Ser. No. 60/964,457 filed Aug. 13, 2008.

FIELD OF THE INVENTION

This invention relates to wind speed detectors and especially to crosswind wind speed detectors.

BACKGROUND OF THE INVENTION

Sniper skills are in demand in current US military operations. Although sniper weapons have the capability to shoot at ranges beyond 1 km, wind effects on bullet trajectories degrade the performance of sniper systems, particularly at ranges of 300 m or more. Spotters and snipers estimate winds largely by visual observations, and then adjust weapon sights and the shooter's point of aim. Accurate crosswind estimation is the biggest single factor in achieving first round hits at very long ranges; this manual process is especially challenging in windy conditions, in poor visibility, or at night.

Various detectors are available for remote detection of wind speed. These include detectors based on Doppler principals using light or acoustic reflections from particles flowing with the wind detected with a sensor. But these detectors are limited to detection of wind speed along the axis of the sensor. Measurements of crosswinds are more complicated. An approach for measuring path-integrated crosswind based on laser beam degradation phenomenon called scintillation was suggested in M. S. Belen'kii, "The Effect of Residual Turbulent Scintillation and Remote Sensing Technique for Simultaneous Determination of Turbulent and Scattering Parameters of the Atmosphere,", *J. Opt. Soc. Amer. A* Vol. 11, No. 3, pp. 1150-1158 (1994). That device collected reflected light from a laser beam directed at a retro-reflecting target. The reflected light is detected by two separated detectors (each with a number of fields of view) which monitored turbulent scintillation effects. Wind speed can be determined by time differences between the passages of dark fringes across various fields of view. With this device using the retro-reflector a small inexpensive HeNe laser could be used. This method was experimentally demonstrated as described in M. S. Belen'kii, G. G. Gimmestad, and D. W. Roberts, "Single-ended Laser Wind Sensor," *In Image Propagation Through the Atmosphere*, Proceeding SPIE, Vol. 2828, 489-494 (1996) using a 4 mW He—Ne laser in a controlled, laboratory environment and also outdoors. The laser wind sensor was found to be more sensitive than the mechanical anemometer. It recorded air motion within the range of ±0.25 m/s. This method can be modified for measuring the crosswind profile along the propagation path by using the concept of a cross-path LIDAR technique described in M. Belen'kii, et. al., "Optical Methods for Turbulence Profile Determination" Final Report, AFRL, 2005. However, such an approach similar to previously suggested active crosswind sniper systems has a fundamental shortcoming. It requires the transmission of two laser beams in the atmosphere. This greatly increases complexity of the sniper system, as well as power consumption, size, weight, and cost. In addition, it can jeopardize the covertness of the sniper operation.

There are many important applications for a good low-cost, light weight crosswind profiler. An important application is for use in crosswind correction for telescopic aiming devices for military rifles.

What is needed is a small, light weight passive crosswind profiler.

SUMMARY OF THE INVENTION

The present invention provides a passive optical crosswind profiling system. The system includes at least one telescope defining two apertures separated at a distance and adapted to collect light along at least two separate paths from a field of view containing a target and at least one high-speed digital camera defining at least one many pixel sensor wherein pixels of said at least one many pixel sensor are identified as separate blocks of pixels. The system further includes an optical system for focusing light collected along said at least two separate paths by said at least one telescope onto said at least one many pixel sensor to produce at least two images of the target scene and a high-speed computer processor programmed to with a special block matching correlation algorithm to correlate image data collected the separate blocks of pixels in order to calculate a crosswind profile along a path between said system and said target.

This sensor system uses a stereoscopic imaging system to measure a 2D crosswind profile along the path. As compared to previously suggested active cross-wind sniper system, the present invention has several principal advantages: a) it completely eliminates the need for transmission of a laser beam, or multiple laser beams, toward the target in the atmosphere. This provides covertness of the sniper operation; b) the system eliminates the need for a laser and its power supply. This greatly reduces the sensor system complexity, as well as its size, weight, and power consumption.

Depending on the wind velocity, range, and bullet type, cross-wind error can be very large. The maximum bullet deflection at 1 km range is 10 m, and it is 50 m at 2 km range. To compensate for the effect of downrange wind, 2D cross-wind information combined with ballistic corrections are needed. The present invention overcomes the shortcomings of prior art crosswind detectors. It is a passive optical system that can provide precision 2D cross-wind profile measurements along a target path. It reduces the system complexity, its size, weight, cost, and power consumption. Also it is better suited for covert sniper operations.

The principal of the proposed system is the following. The system includes a binocular type imager with two apertures separated at some distance such as about 13 centimeters. Two images of the target scene are acquired on a many pixel sensor of a high speed and high resolution digital camera. The pixels of the digital camera are divided into blocks, with blocks sizes such as 20 pixels per block. The multiple image frames are processed using a block matching algorithm.

For example, if the range is 1 km, angular pixel size is 4 μrad, and camera frame includes 512×512 pixels, then the frame will cover an area of 2 m×2 m in the target plane. If each block includes 20×20 pixels, than a linear block size in the target plane is 8 cm. The image will include 25×25=625 blocks. The objective of the image processing algorithm is to determine a spatial-temporal correlation of the local horizontal and vertical shifts of the blocks of the images caused by air turbulence. Given a time delay, the shift of the peak of the cross-correlation and direction of the shift determine the local cross-wind and direction at the location along the path where the ray trajectories of the two cross-paths intercept. The imaging blocks separation in the target plane and imaging lens separation in the sensor plane allows Applicants to implement a cross-path sensing approach for turbulence profile determination". This permits us to probe the atmosphere inside small sampling volumes. The size of the volume is determined by the size of the imaging lens and with these parameters is on the order of 3-5 cm and by the separations between the lenses in the sensor plane and between the lenses in the target plane.

This block matching processing algorithm can process imagery data collected using a stereoscopic, or binocular, type system, to retrieve a cross-wind profile along the path. Due to the large number of blocks in the image and large number of frames (30-200 frames/sec), a good statistical accuracy can be achieved in estimating statistics of local tilts, or block shifts. A crosswind velocity is determined simultaneously at multiple locations along the range without moving parts. This provides a basis for high precision of crosswind determination.

DETAILED DESCRIPTION OF PREFERRED EMBODIMENTS

Components of Preferred Embodiments

Figure 1:
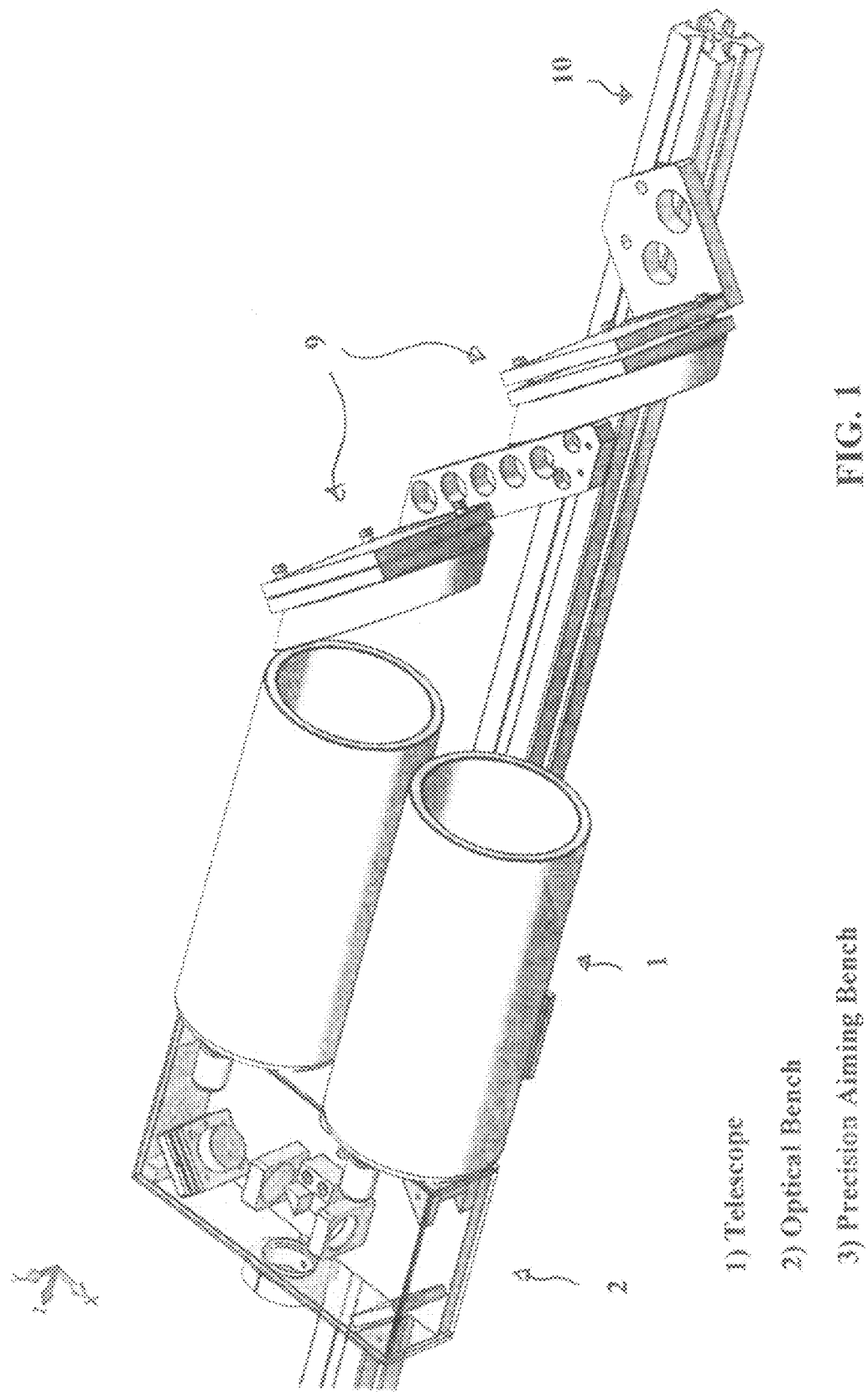
FIGS. 1 and 2 are drawings of a preferred embodiment of the present invention using two telescopes.
Figure 2:
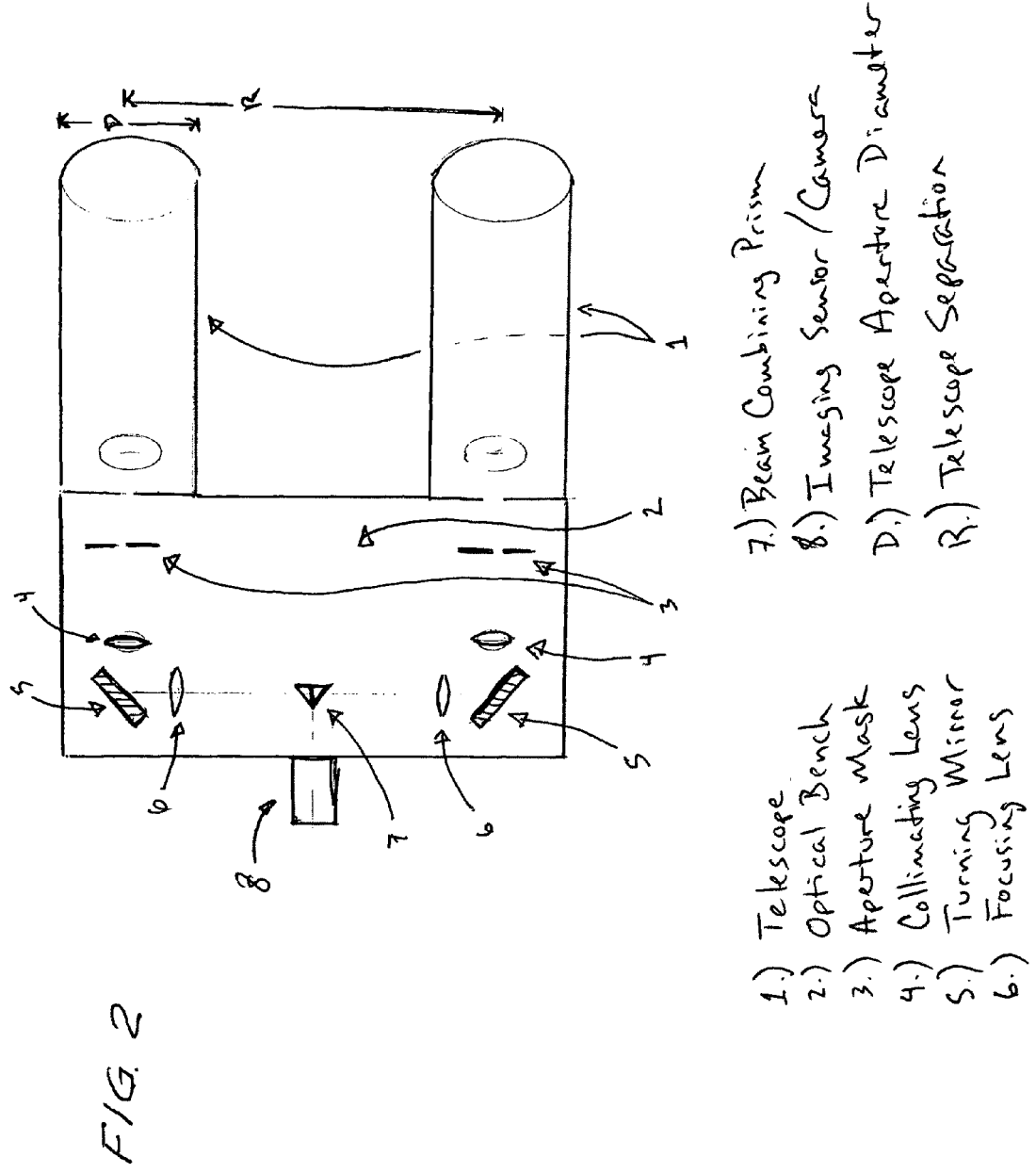
Figure 3:
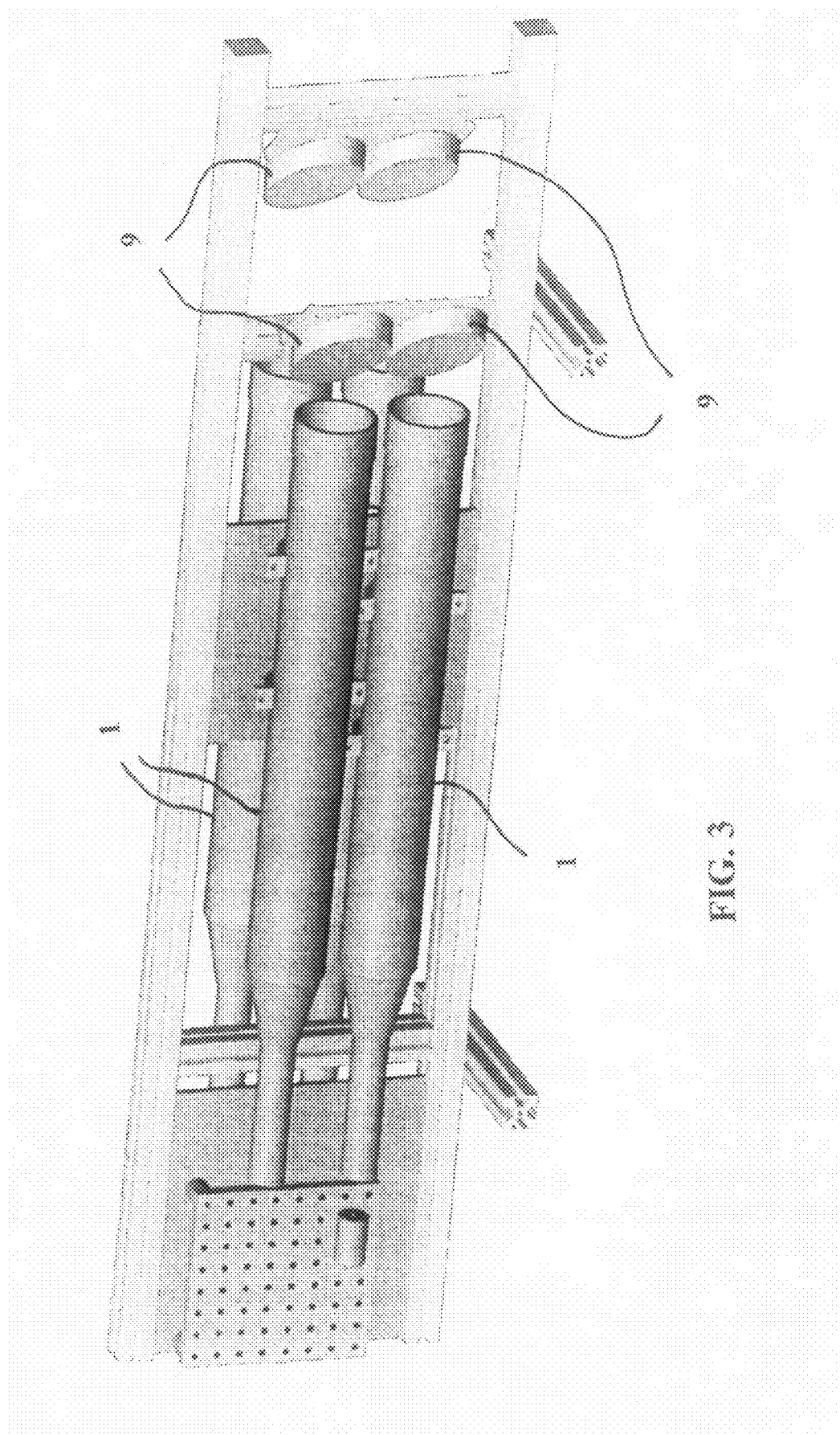
FIG. 3 is a drawing of a preferred embodiment using four telescopes which Applicant and his fellow workers have tested extensively.
Figure 4:
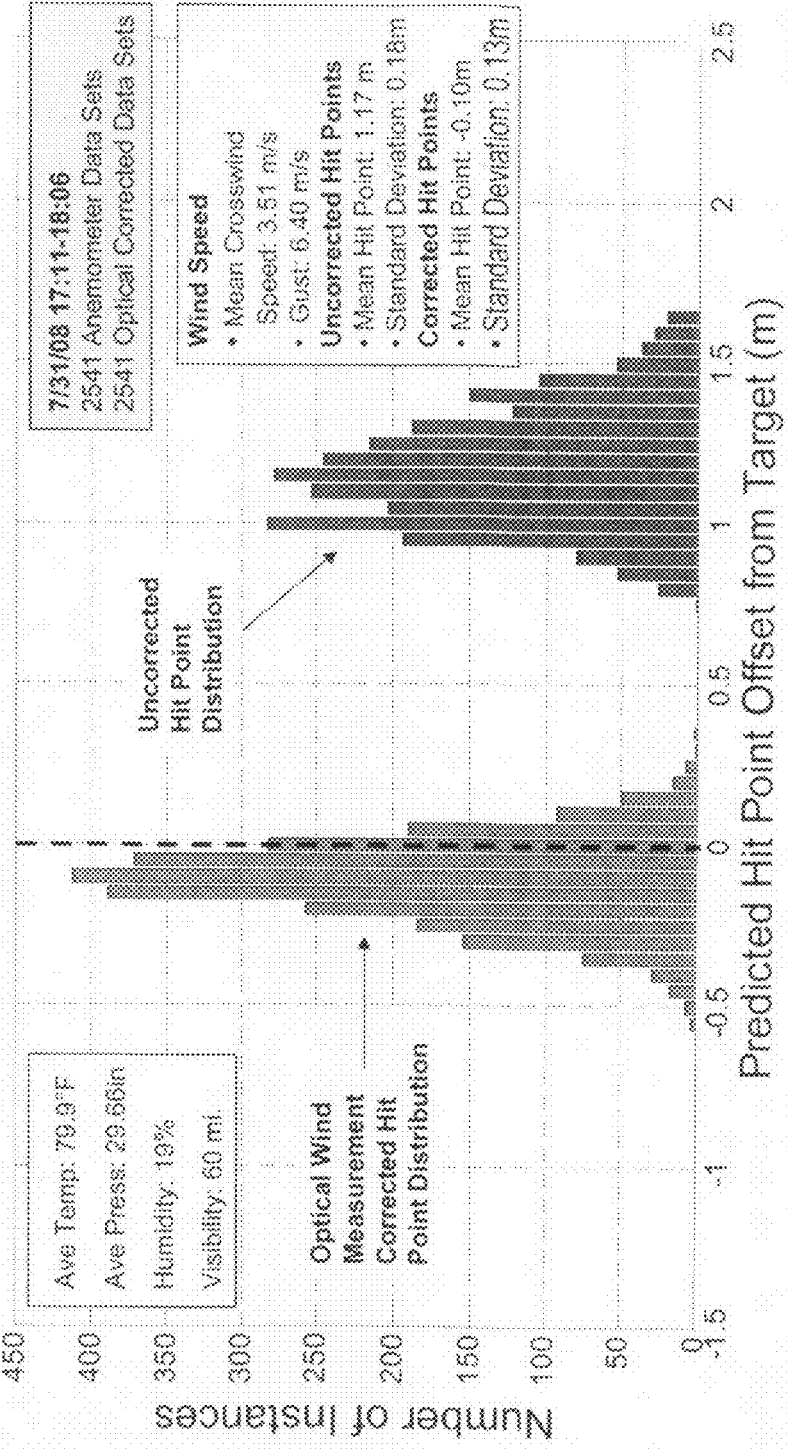
FIG. 4 through 7 are charts that show improved accuracy of hit points with the four telescope embodiment as compared to uncorrected hit points.
Figure 5:
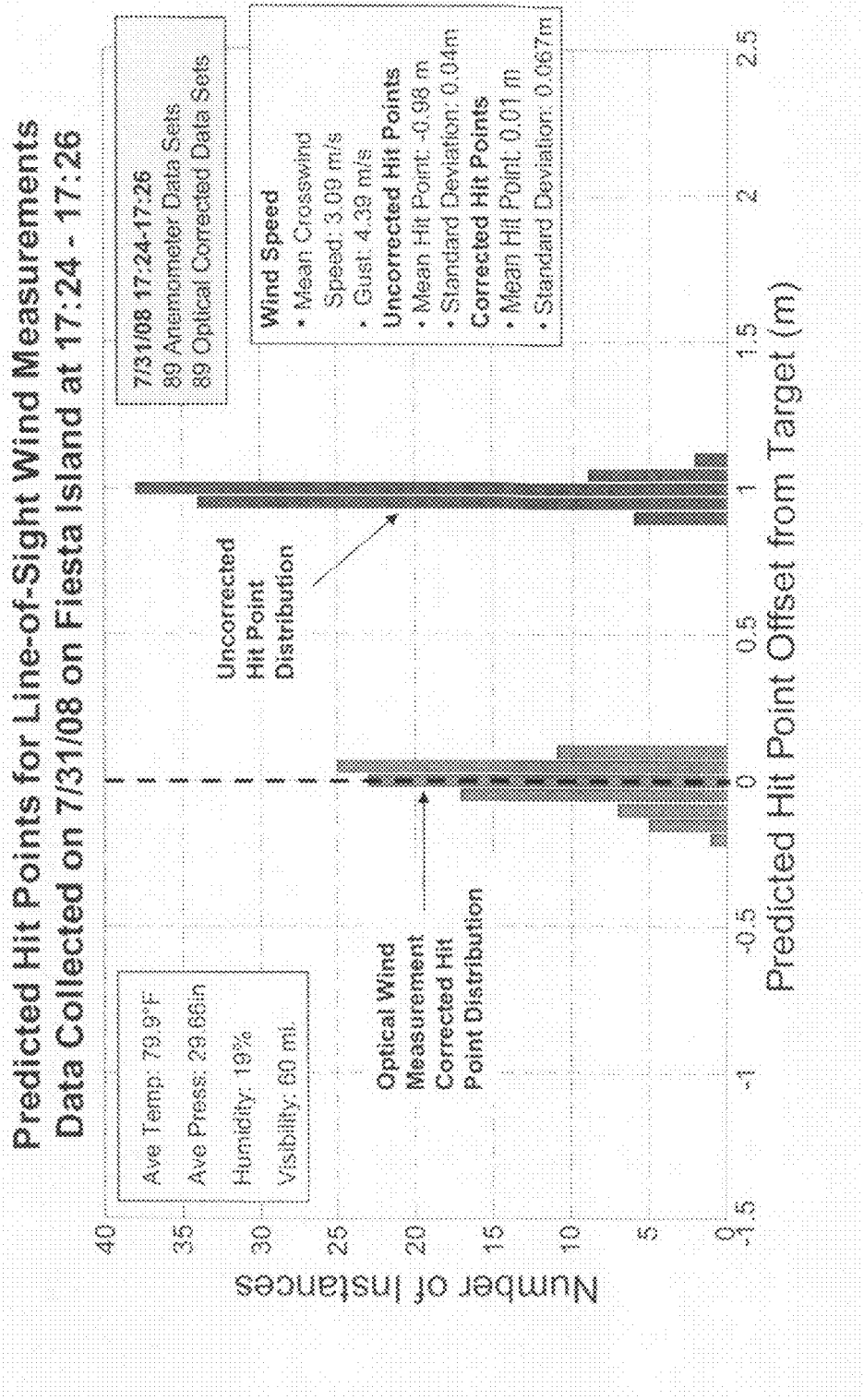
Figure 6:
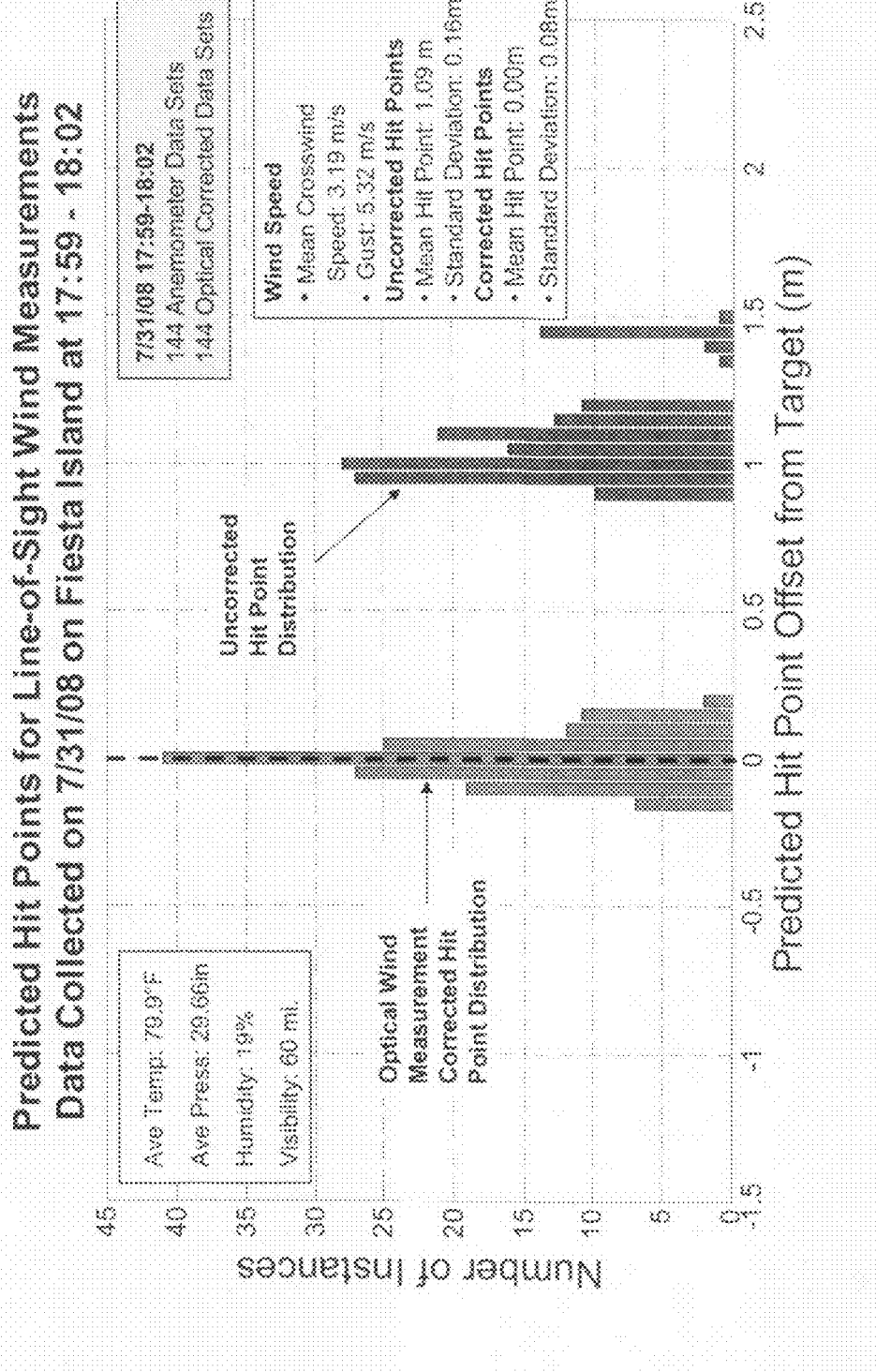
Figure 7:
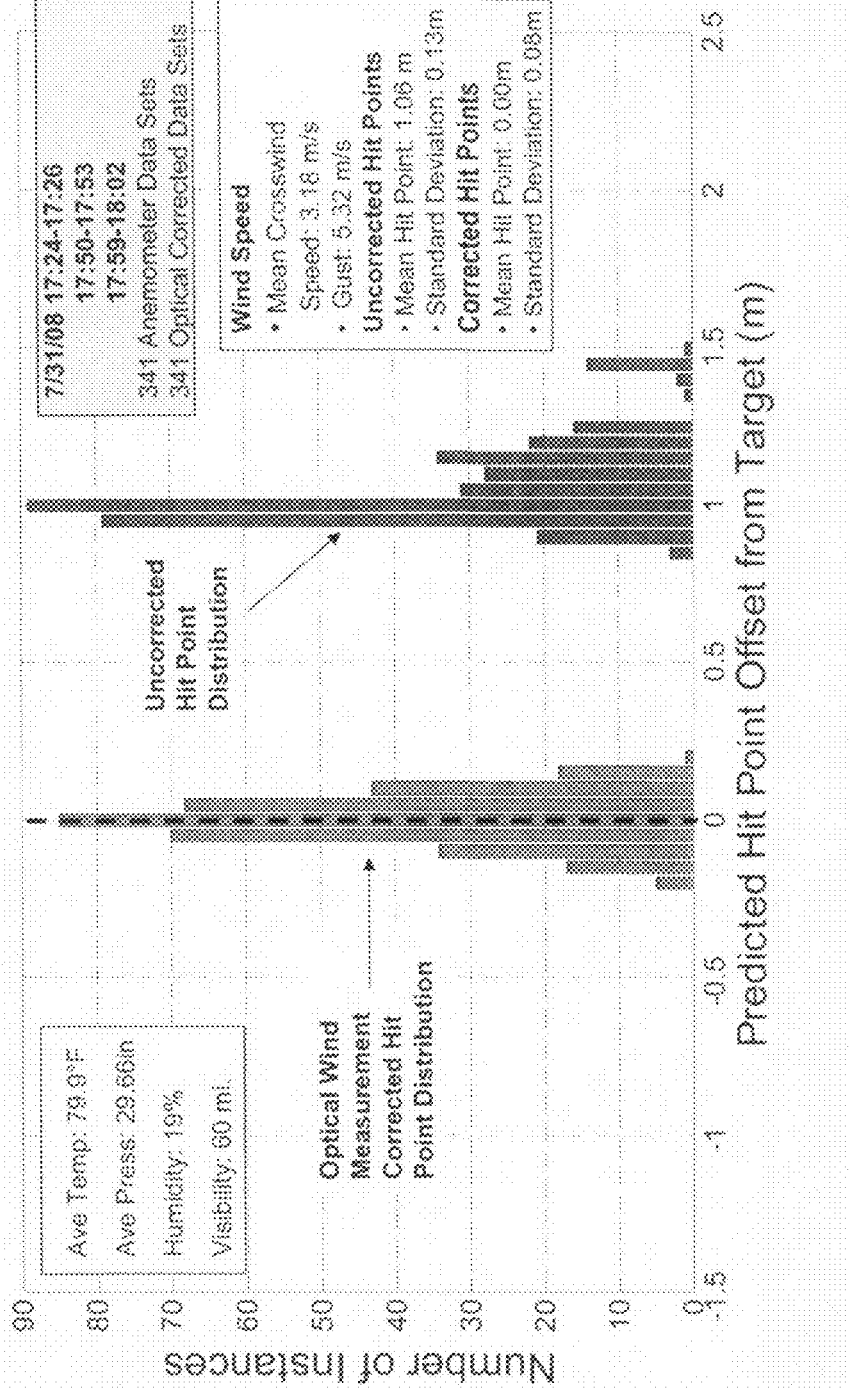
Figure 8:
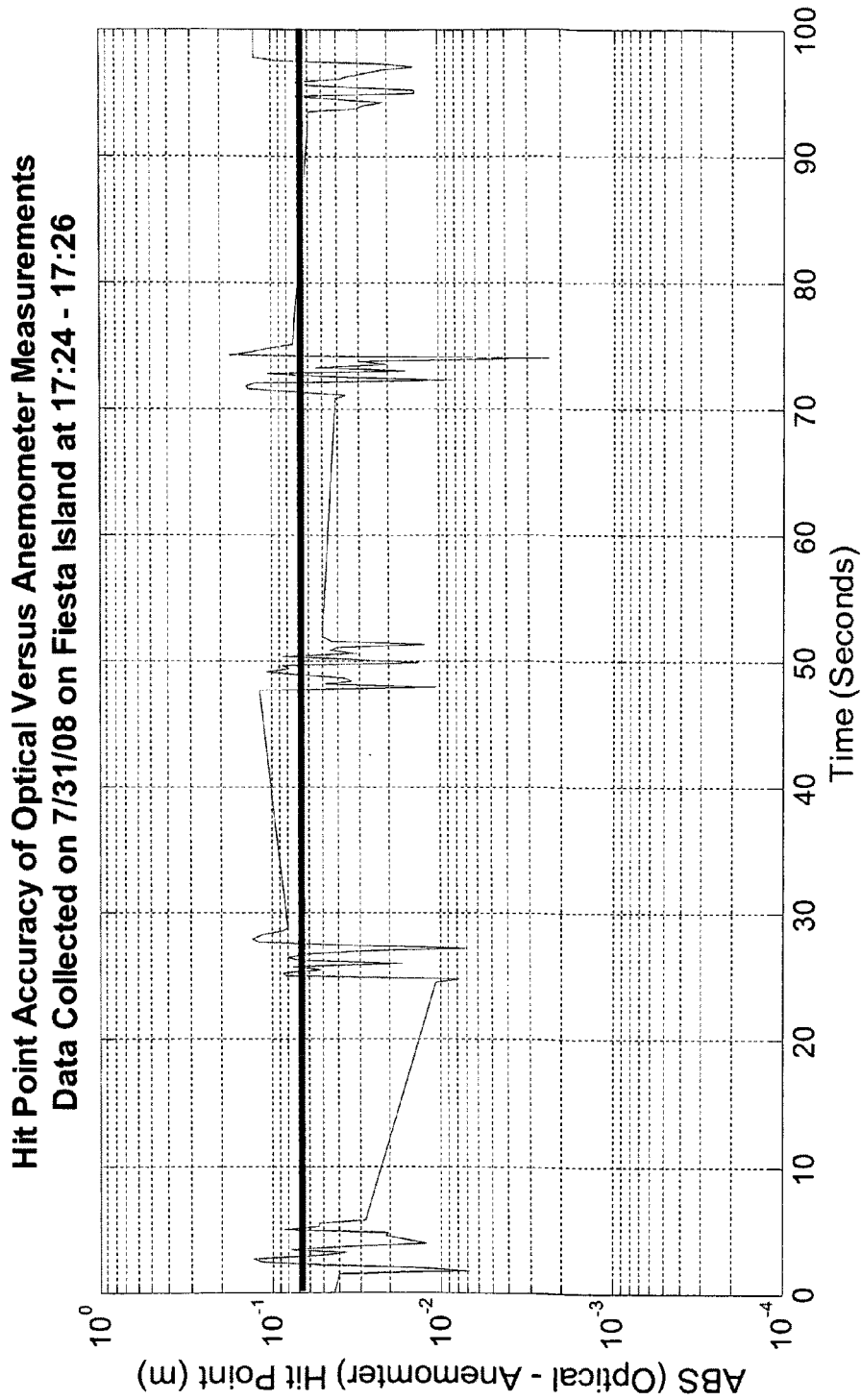
FIG. 8 is a chart that shows how quickly the optical data is collected and processed to determine corrections for crosswinds.\

Important components of preferred embodiments are shown in FIGS. 1, 2 and 3. These components include at least one telescope 1. FIGS. 1 and 2 show two telescopes. In preferred embodiments one of the telescopes is mounted about 13 cm above the other. Mounting the telescopes vertically avoids close-in clutter as will be described in more detail below. FIG. 3 shows an embodiment with four telescopes separated horizontally and vertically. The additional telescopes permit many additional correlation possibilities but also increase the size and weight of the system. Some preferred embodiments utilize only one telescope and utilize mirrors to collect image data from separated apertures for the correlations needed for the wind speed determinations. Components of an optical bench 2 are shown in FIG. 2. These include aperture mask 3, collimating lenses 4, turning mirrors 5 focusing lenses 6 beam combining prism 7 and image sensor (camera) 8. The telescope aperture diameters are shown at D and the telescope separation is shown at R. Precision aiming mirrors 9 and support superstructure 10 are shown in FIG. 1. Additional details regarding these components are provided in the sections that follow.

Tests Results

Applicant and his fellow workers preformed preliminary field demonstration, in which a passive optical sensor was tested against 3-cup anemometers distributed along various ranges including a 750 m range. FIGS. 4, 5, 6 and 7 show an overview of the data collection on Jul. 31, 2008. In these tests, the optical crosswind profile from a four telescope version was compared with independent crosswind measurements using 10 ultrasonic anemometers located along the path to the target. FIGS. 4-7 depicts optical crosswind measurements as a carpet plot versus time and range. The data represents deviation from the optical wind speed data as compared to the anemometer wind speed data and those data were turned into hit point offset data assuming that rifle pointing was corrected according to the optical wind speed data and that uncorrected hit point distribution was uncorrected for wind speed. It is seen that at a given time the system measures different crosswind velocities at different ranges. The figures represent various collections of data recorded during the several-hour test. All of the charts show enormous improvement in hit accuracy as compared the uncorrected hit point distribution. Corrected hit point offsets were within a few centimeters whereas the uncorrected hit point offset errors were in the one meter range.

System Operation

System operation is based on phase-related phenomenon. The system extracts the crosswind profile information from the measurements of spatially varying local wavefront tilt, or phase gradient across the spotting scope aperture. As opposed to turbulence-induced scintillation, the phase fluctuations do not saturate with increasing range and strength of turbulence, characterized by the refractive index structure characteristic $C_n^2$. Consequently, system performance is immune to variations in strength of turbulence and engagement range. In the measurements, the only unknown parameter is the crosswind velocity, whereas the laser-based approaches in addition to wind velocity should take into account variations of $C_n^2$ and range and the corresponding change in statistics of turbulence-induced scintillation. Also because wavefront tilt is wavelength independent, imaging sensors operating in different spectral wavebands can be used in system implementation.

Preferred embodiments use two telescopic scopes that are separated vertically. Vertical separation eliminates the contribution of a near field turbulence which can overwhelm the contribution to the local tilt from the sampling volume near the crossing point between the line-of-sights from the top and bottom scopes to two image blocks in the target scene. By using two vertically separated scopes, one can measure the crosswind velocity simultaneously at multiple locations along an engagement range.

The crosswind information is extracted from the passive imagery data alone. Also the system extracts wind information using natural target scene illumination; therefore the range of visibilities, atmospheric turbulence and scintillation, and environmental operating conditions for the system are the same as that for the spotter. If you can see the target, the system can profile the crosswind.

Development of Concept

Major advances have been made over the last decade in several related areas, including anisoplanatic imaging though atmospheric turbulence wavefront tilt, or angle-of-arrival, anisoplanatism, cross-path technique for profiling the strength of turbulence at astronomical sights using laser guide stars, and algorithm for correction of atmospheric effects on optical imagery data. It was found that when an extended incoherent target is imaged through atmospheric turbulence, the image edges appear wavy. This edge waviness is due spatially varying wavefront tilt, or due to the fact that optical waves emitted from different regions of the target propagate through different atmospheric paths and acquire different tilts. The latter effect is commonly refereed to as "tilt anisoplanatism". Similarly, internal features of the target image also randomly move from frame to frame due to spatially varying tilt. This image features motion is caused by the motion of turbulent eddies across the line-of-sight carried by the wind. Consequently, a crosswind velocity can be determined from measurements of the spatial-temporal statistics of the local tilts. Thus local tilts measurements provide a physical basis for Applicant's proposed passive optical crosswind sensing approach.

In surveillance systems operating in the turbulent atmosphere, a spatially varying tilt and low order aberrations cause image defects that degrade the target image. To overcome these image defects, Roggemann, Welsh, and Klein developed the Block Matching (BM) algorithm, which senses the local shifts of small image blocks and then "remaps" the image in such a way as to remove the image distortions.

The BM algorithm was extensively tested on a variety of simulated and real imagery data, providing improved image quality under a wide range of conditions. In addition, a real-time correction of video imagery data was demonstrated. Applicant's approach for crosswind profiling uses the BM algorithm for sensing spatially-varying local tilts in the images of the target scene, recorded using top and bottom scopes.

Basic Concept of the Present Invention

Preferred embodiments of the present invention uses a stereoscopic imaging system that includes two vertically separated telescopic scopes and a high-speed camera. The system passively measures the crosswind profile using natural target scene illumination with required accuracy in a given measurement period, and with required number of profiled segments over the engagement range. It operates both day and night. In addition to two telescopes and a high speed camera, the system also includes an embedded processor, a battery, and a communication link to transmit predicted wind impact to the shooter scope. The embedded micro-processor estimates the crosswind profile from a set of short-exposure images of the target scene, and calculates predicted wind offset for bullet trajectory using a commercially available ballistic model, PRODAS. Other models could be used. The predicted wind impact is displayed on a shooter scope display.

In a four telescope embodiment the four telescopic scopes are vertically separated by 10 cm and horizontally separated by 13 cm. The fields of view of each pair of telescope are imaged on two synchronized high-speed digital cameras. Image blocks of 20 pixels (each representing 5 microradians of the target field of view) in the top and bottom images of the target scene are separated both vertically and horizontally. The blocks of pixels are analyzed with a special algorithm described below to detect atmospheric distortions and the blocks are correlated with a special algorithm described below to match similar distortions in the field of view as over a period of time corresponding to the approximate time required for wind to cross the field of view. Thus, if the wind is blowing from left to right across the field of view, blocks viewing horizontally adjacent 5-microradian fields of view should see the same distortion, but the distortion should be progressively delayed from left to right as the distortion moves across the total telescopic field of view. When vertical block separation is increased, the intersection of two line-of-sights from the top and bottom scopes to selected blocks in the target scene moves toward the spotter. When vertical separation between image blocks is reduced, the intersection of the line-of-sights is closer the target. Thus, by varying vertical separation between image blocks used for calculation of the tilt cross-correlation, the crosswind velocity is measured simultaneously at multiple ranges. Therefore, the crosswind probing at different ranges is achieved in the software, with no moving parts. These correlation measurements require a very fast computer processor. In preferred embodiments Applicant uses a processor which completes all necessary calculations in one second and provides a wind speed map at multiple segments (such as five segments) between the telescope system and the target.

Using the target range measured by a laser rangefinder, the software selects the block separations that allow simultaneous measurements of the crosswind velocity at multiple segments having ~200 m thickness along the engagement range. Note that image blocks separated both vertically and horizontally. The horizontal separation between blocks determines the time lag of the peak of the local tilt cross-correlation, from which the crosswind velocity is estimated. The preferred horizontal separation of 13 cm is optimized based on past experience and field test results.

Details of Concept

First, local tilts in small subregions called blocks are determined using BM algorithm. Each image is partitioned into the 2-D array of image blocks having the size of the tilt isoplanatic angle (~120 μrad for a 6 cm scope). Then X- and Y-random shifts for each block in the image caused space-varying wavefront tilts are determined. Then the local tilts for selected blocks are correlated. The crosswind velocity is determined from the measured time lag of the peak of the cross-correlation of the wavefront tilts. Position of the range bin where the crosswind is measured, determined by a path-weighting function of the tilt cross-correlation, is described below in the section entitled "Path Weighting Fundtion".

System Physics—Local Tilt Measurements

The system concept is based on a phase-related phenomenon; the crosswind profile is extracted from the measurements of space-varying local tilts, or phase gradients. The physical process is the following. When a light wave from the target propagates through turbulent eddies, the wavefront is distorted. Because turbulent eddies include variations in the refractive index of the air, some portions of the wavefront are accelerated, whereas others are decelerated. When an aberrated wavefront arrives at the telescopic scope, there are small- and large-scale wavefront aberrations, with respect to the scope diameter. Small-scale aberrations cause image blur, whereas the large-scale aberration, called wavefront tilt, or angle-of-arrival, causes image motion. The wavefront tilt is related to the phase gradient of the incoming wave across the aperture by the following equation:

$$\alpha = \frac{\Delta S(D)}{kD}, \quad (1)$$

where $\Delta S(D)$ is the phase difference at the distance equal to the aperture diameter D, and $k=2\pi/\lambda$ is the wavenumber. A linear shift of the image in the image plane, $\Delta l$, is determined by the product of the wavefront tilt and focal length of the scope, $\Delta l=\alpha \times F$. According to Tylor's frozen turbulence hypothesis, turbulent eddies are carried by the wind across the optical line-of-sight. Therefore, one can conclude that the target image motion contains information about the crosswind along an optical path.

It is important to note that, as opposed to intensity variations, or turbulence-induced scintillation, statistics of the wavefront tilt and phase gradient is invariant with respect to strength of turbulence. In particular, wavefront tilt statistics do not saturate with increasing the range and strength of turbulence. For example, the probability distribution of the phase fluctuations and wavefront tilt is Gaussian with zero mean for any turbulent conditions along propagation path. The characteristic scale of the phase structure function, $D_s(\rho) = \langle [\Delta S(\rho)]^2 \rangle$, where $\rho$ is the separation between observation points, is determined by the atmospheric coherent diameter, or Fried parameter, $r_0 = (2.91 C_n^2 kL)^{-3/5}$ under weak, intermediate, and strong turbulence conditions. Finally, the wavefront tilt variance is given by equation:

$$\sigma_\alpha^2 = 1.14 C_n^2 L D^{-1/3}, \quad (2)$$

where L is the range. Eq. (2) is valid for any strength of turbulence over engagement range from 50 m to 200 km for an air-to-air communication link.

Note that the rms tilt determines the magnitude of the turbulence-induced block image motion in the system measurements. The tilt variance increases with decreasing the scope diameter as $D^{-1/3}$. This provides an important advantage for a small aperture scope, as compared to the large scope.

Also because the system is immune to the effects of strong scintillation, it can operate over a wide range of conditions that are consistent with the range of visibilities, atmospheric turbulence and scintillation, and environmental operating conditions for the spotter. The system can operate under daytime turbulent conditions at 1-2 km range.

Theory—Tilt Anisoplanatism

The system determines the crosswind profile passively by extracting the crosswind information from the measurements of spatially-varying tilts, or phase gradients across the scope aperture, which is commonly referred to as "tilt anisoplanatism". A tilt correlation angle, or tilt isoplanatic patch size, $\theta_t$, characterizes the size of the sub-region of the image that moves as a whole, whereas the sub-regions separated at angular distance $\theta > \theta_t$ move independently. Note that the block size in the block matching algorithm in system software used for crosswind profile determination is determined by tilt isoplanatic angle, or tilt isoplanatic patch size given by equation $$\theta_t = \gamma(L_0/D)\left(\frac{D}{L}\right) \quad (3)$$

where L is the range, and $L_0$ is the turbulence outer scale. The coefficient $\gamma$ in this equation for system measurements is $\gamma=2$. Thus, $\theta_t$ depends only on two parameters: a) the scope aperture diameter D and b) range L. Importantly, tilt isoplanatic angle does not depend on the strength of turbulence characterized by structure characteristic $C_n^2$ and wavelength. This simplifies system implementation and data reduction.

It is easy to see, that the tilt isoplanatic angle $\theta_t$ differs strongly from the isoplanatic patch size $\theta_0$ that characterizes correlation scale for all phase fluctuations including low-order and high-order wavefront aberrations:

$$\theta_0 = [(3/8) 2.91 k^2 C_n^2 L^{8/3}]^{-3/5}, \quad (4)$$

where $k=2\pi/\lambda$. The isoplanatic patch size $\theta_0$ depends on $C_n^2$ and wavelength, whereas tilt isoplanatic angle $\theta_t$ does not. One the other hand, the isoplanatic angle $\theta_0$ does not depend on the aperture diameter D and turbulence outer scale, whereas tilt correlation angle does. Finally, in strong turbulent conditions on the near-the-ground horizontal paths, tilt isoplanatic angle exceeds the isoplanatic angle by several orders of magnitude: $\theta_t \gg \theta_0$. For example, for 6 cm aperture (D=6 cm) and 1 km range, $\theta_t=120$ μrad, whereas at the same range, for $C_n^2=5\times10^{-13}$ cm$^{-2/3}$ in the visible waveband ($\lambda=0.6$ μm) the isoplanatic angle is $\theta_0=1.3$ μrad. A large angular size of the tilt isoplanatic angle $\theta_t$ that determines the block size in system image processing algorithm reduces the amount of calculations for the crosswind profiler determination.

Tilt Spatial-Temporal Correlation and Path Weighting Function

The tilt spatial-temporal correlation $b_{x,y}(r)$ and the path weighting function $b_{x,y}(S)$ are set forth below:

$$b_{x,y}(r) \sim \int_0^L dz C_n^2(z)(1-z/L)^{5/3} \int_0^\infty d\kappa W_\phi(\kappa) G(k)[J_0(\kappa r/D) \mp J_2(\kappa r/D)]$$

$$b_{x,y}(S) \sim \int_0^L dz C_n^2(z)(1-z/L)^{5/3} \int_0^\infty d\kappa W_\phi(\kappa) G(k)[J_0(A\kappa) \mp J_2(A\kappa)]$$

$$A = 2\left(\frac{S/L}{D/L}\right)(z/L)$$

$$\vec{r}\{0, r_Y\} \vec{S}\{S_X, S_Y\} \vec{S}\{0, S_Y\} \vec{V}\{V_X, 0\}$$

$$r_{\text{eff}} = \left\{\left[\left(1-\frac{z}{L}\right)\vec{r} - \left(\frac{z}{L}\right)\vec{S} - V_X \tau\right]^2\right\}$$

$$r_{\text{eff},Y} = \left(1-\frac{z_0}{L}\right)r_y - \left(\frac{z_0}{L}\right)S_Y = 0$$

$$z_0 = \frac{L}{\left(1+\frac{S_Y}{r_Y}\right)}$$

$$r_{\text{eff}}^2 = r_{\text{eff},X}^2 + r_{\text{eff},Y}^2$$

$$r_{\text{eff},X} = \left(\frac{z_0}{L}\right)S_X - V_X \tau = 0$$

$$V_X = \frac{(Z_0/L)S_X}{\tau}$$

Block size and separation also play a significant role in determining what volume of the atmosphere is being measured for wind speed along the line of sight. In the cross path technique, the distance between blocks is directly related to the range being sampled under the equation:

$$z_i = \frac{L}{(1+((S_{ang}*L)/r))} \quad (4)$$

L is the total range to the imaged scene, $S_{ang}$ is the angular separation between blocks in the image plane parallel to the aperture separation, and r is the physical separation between the binocular scopes. When $S_{ang}$ is multiplied by the total range L, it gives the physical block separation at the target scene thus yielding a ratio of aperture separation at the observer to block separation at the target. It can be seen that by reducing the block separation, $S_{ang}$, more ranges are able to be sampled and at distances closer to the target. However, due to processing time constraints and a physical limitation on optics and angular pixel size may be considered in choosing these prarmeters. Path weighting function represents the optical system's sensitivity as a function of range. Items that determine the PWF consist mainly of the geometrical components, meaning range to target and aperture separation.

Block Matching Algorithm

The Block Matching Algorithm (BMA) was developed by Roggemann, Welsh and Klein under a US Army program "Real-Time Image Reconstruction for Wide Field-of-View Anisoplanatic Imaging Through Turbulence." Their algorithm was tested and found to provide the information necessary to reconstruct imagery correcting for space varying tilt and low order wavefront aberrations. The BMA subdivides a target scene into equally partitioned overlapping blocks and estimates local block shifts, or local tilts, by comparing incoming frames with a continuously updated reference image. The comparison is performed by maximizing a spatial correlation between image blocks within a localized search window. The normalized correlation of block motion is defined in Eq. (3), with the following variables: R is the reference image, C is the current image, M and N are the dimensions of the blocks, x and y specify the pixel location of each block within the frame, and i and j are pixel-wise indexed though a search region.

$$NC(i, j) = \frac{\left(\sum_{k=0}^{M-1}\sum_{l=0}^{N-1} C(x+i+k, y+j+l)R(x+k, y+l)\right)}{\left[\left(\sum_{k=0}^{M-1}\sum_{l=0}^{N-1} C(x+i+k, y+j+l)\right)^2 \left(\sum_{k=0}^{M-1}\sum_{l=0}^{N-1} R(x+k, y+l)\right)^2\right]^{1/2}} \quad (3)$$

A match is found at the coordinates (i,j) where the normalized correlation is maximized indicating the offset between the current image and the reference image.

Figure 9:
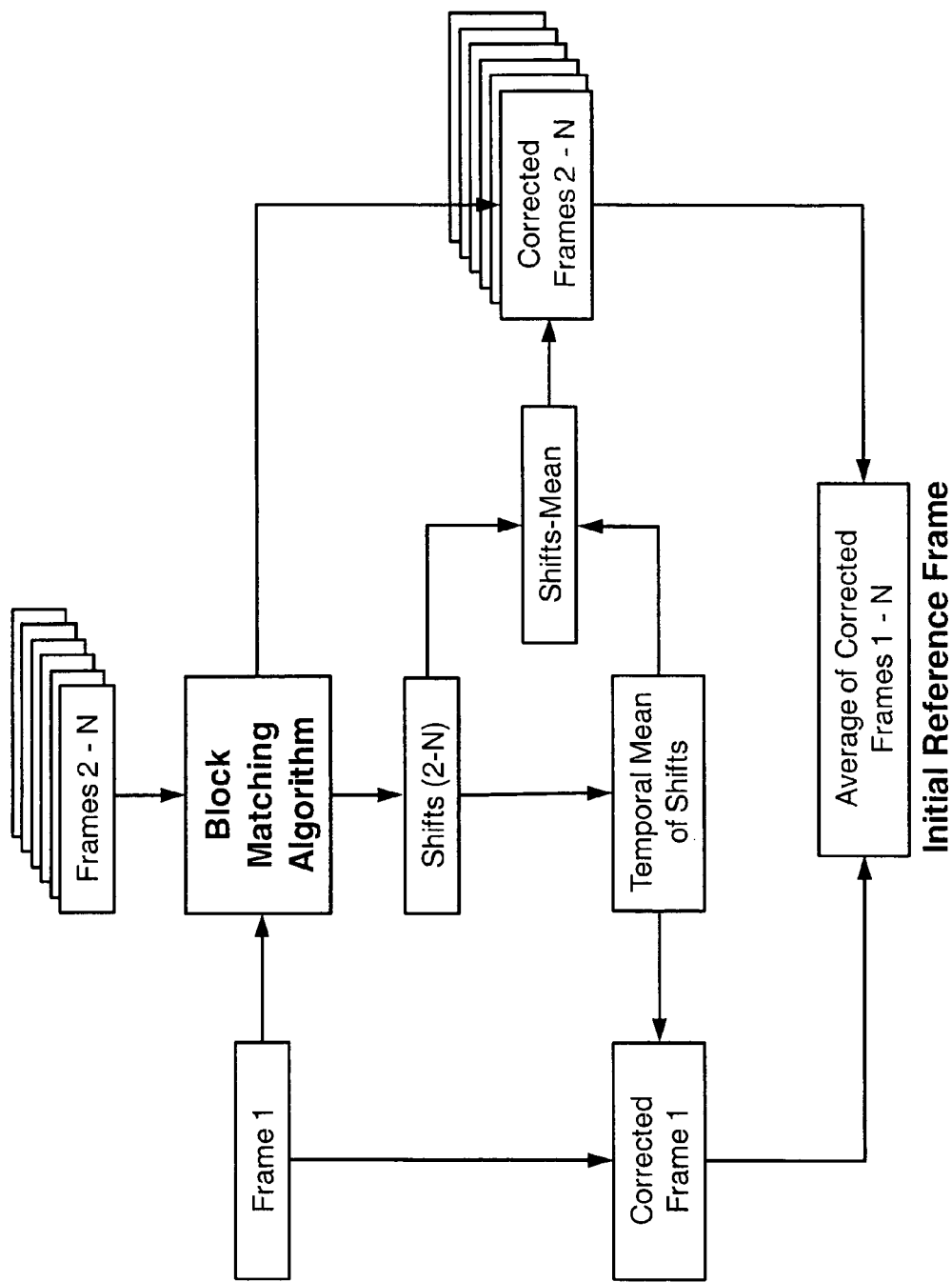
FIG. 9 is a block diagram of the calculation of an initial reference frame.

The first part of the block matching algorithm is to create the initial reference image, or reference frame; a step that only needs to be conduced once at the beginning of data collection as the reference image generation includes an evolution equation under operational mode. The initial reference image is generated in a series of a few steps: First, compare the initial frame collected to a predetermined number of subsequent frames by using the normalized correlation block matching technique. Save out a time series of measured tilts resulting from the block matching algorithm. Find and apply the offsets from the mean shift amount for each block to every frame used in the initialization process. Corrections to the first initializing reference image are the mean shift amounts from the other images. Sum the corrected initialized frames to generate the initial reference image to be used starting with the first frame collected, previously used in initialization. A block diagram of the initialization process is shown in FIG. 9.

The phenomenology behind a multi-frame reference image is that turbulence induced motion, tilts, have zero mean over an extended amount of time. There will be some residual blurring as a result of the jitter; however, in order to negate the effect of edge degradation by the turbulence induced jitter, tilt corrections are made to each frame prior to including them in the sum.

Figure 10:
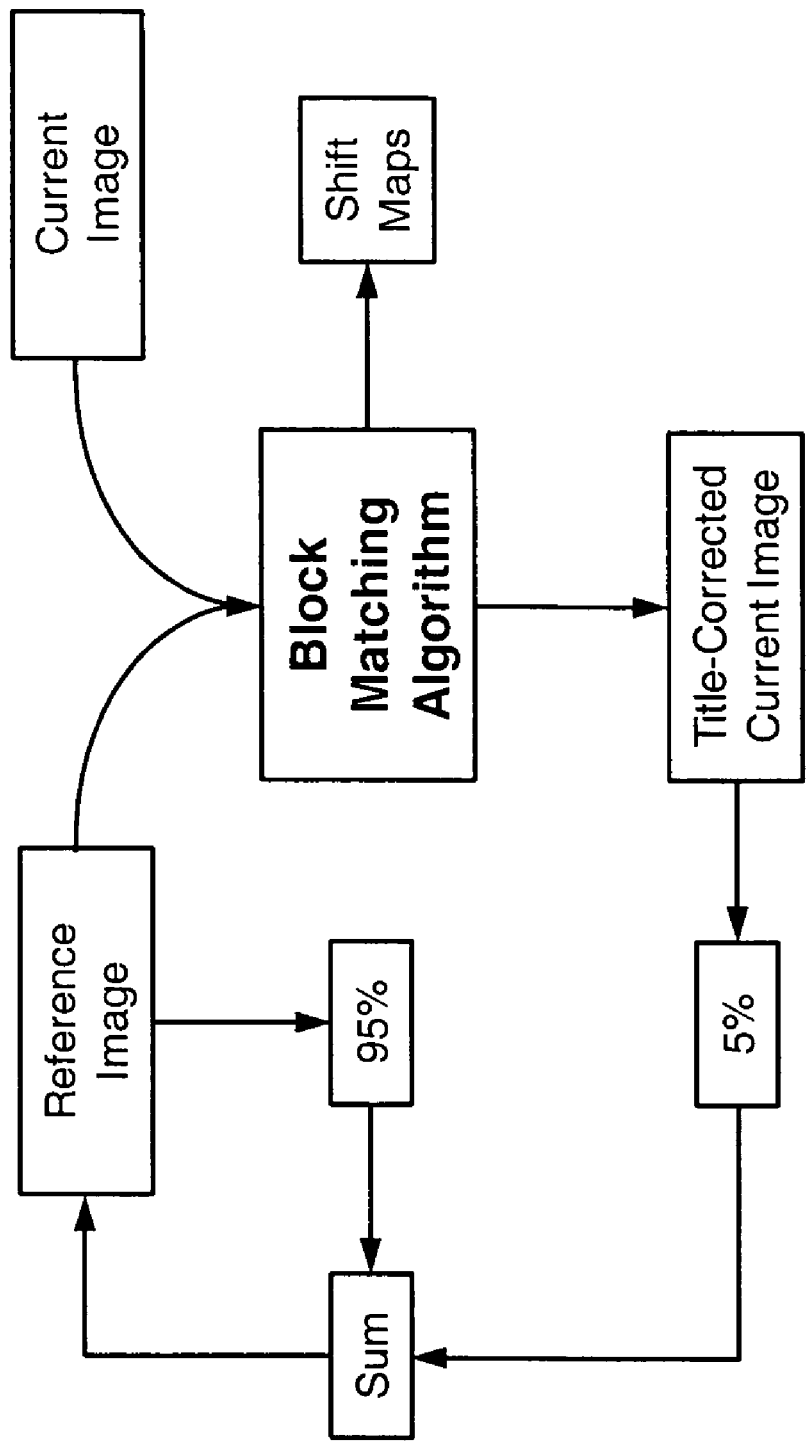
FIG. 10 is a block diagram of continuous operational mode.

A second pass through the block matching algorithm, in operational mode, yields tilts unique to individual frames, opposed to a mean tilt for N initialization frames, whereby we can derive tilt statistics for crosswind information. These unique local tilts are saved out and set aside for later processing while also being applied as a correction to the current image with a reconstruction algorithm. The corrected current image is then used as a weighted update to the final reference frame. The updated reference frame uses ninety-five percent of the previous reference frame and five percent of the corrected current frame. This scheme of measurement, correction and updating the reference image provides an evolving processing chain that can be carried out to as many frames that are available without having to reset and reinitialize the reference image. The flow of the algorithm in operational mode is depicted by the block diagram in FIG. 10. Note that reference frame is estimated twice: first using uncorrected imagery during initialization, second, using corrected frames. This two steps process allows Applicant to compute in the updated reference frame the high frequency components that are present in individual short-exposure images but are missing in the initial reference frame due to multiple frames averaging.

There are a number of variable parameters associated with the block matching algorithm. Of those parameters, the most influential ones are block size, block separation and search size. While each parameter is directly related to turbulence characteristics, the algorithm is robust enough to operate under a single set of parameters that will work under any condition. Superficially, one would prefer to have block size equal to the tilt isoplanatic patch size. However, the accuracy of the block matching algorithm seems to be indifferent to atmospheric conditions so long as turbulence does not exceed a threshold where defining characteristics are removed by excessive blurring. Based on accuracy and performance, a set of optimal parameters have been chosen with a block size of 16 to 20 pixels with fifty percent overlap between neighboring blocks, and a search size of about ten pixels for the normalized correlation calculation.

The block matching algorithm outputs a set of local tilts for each block saved out on every frame as a time-series. For system application, this is done for each aperture encompassing the entire overlaid target scene. A temporal correlation between the time-series of spatially separated blocks across both apertures is computed. The peak of this temporal correlation determines the amount of time lag for turbulent eddies to move from one region to another region across target image. For small spatial separation between blocks in the target imagery, multiple cross correlations can be calculated for the same block separation. By averaging these cross correlations of all combinations of image blocks, one can improve statistical accuracy of the crosswind velocity and reduce the noise.

Once a time lag is determined for a given separation, it is trivial to calculate the velocity of turbulent eddies and wind direction. A crosswind velocity is determined by dividing the horizontal separation between two line-of sights at a crossing point by the measured time lag for the peak of tilt cross correlation. A wind direction is determined by the Siga of the cross correlation of block motion.

Camera Selection

In order to make measurements of the wind speed using the proposed technique the hardware must provide a series of short exposure images of a scene at least to the maximum wind profile range desired. The images must be collected simultaneously from two apertures a known distance. Nominally the images must be shorter than the atmospheric coherence time. The images must have sufficient resolution and signal to noise to permit correlations from frame to frame. The combination of frame rate and field of view must be large enough to permit "capturing" the correlations within the field of view from frame to frame. In addition the pixel size at the object range (or the angular pixel size and the range to the object) must be known. The brassboard will permit fairly easy adjustment of these parameters over the ranges shown in Table S-1.

Cameras

There are several cameras commercially available which meet the requirements for the daytime demonstration. A few candidates are compared in Table C-1.

TABLE C-1

Commercially available cameras for daytime demonstration.

| | Mod Teledyne UAV-CAM | Dalsa Falcon 1.4M100 | Imperx Lynx series IPXVGA2 |
|---|---|---|---|
| Array size | 1936 × 1086 | 1400 × 1024 | 640 × 480 |
| Subregion size & rate | 512 × 512 up to 188 Hz | | full frame 210 Hz |
| Pixel size | 5 μm | 7.4 μm | 7.4 μm |
| Exposure time | 1-40 ms | 0.033 ms to 4 sec | 0.02 ms to 10 sec |
| Mechanical interface | C-mount | C-mount | C-mount |
| Camera control interface | RS-232 | | RS-232 |
| Output Interface | camera link | dual camera link (2 × 80 MHz) | single or dual camera link |
| #bits | 12 | 10 | 12 bit A/D, 10 bit output |
| Analog gain adj range | 12 dB | 8? | |
| Shutter | rolling | global | |
| Full well | 45,000 pe | | 20,000 pe-40,000 pe |
| Read noise | ~15pe @ high gain | | 14 pe |
| Fill factor | | | 60% |
| Sensor | AltaSens ? (CMOS) | CMOS | Kodak KAI-0430 interline transfer CCD |
| Price | $20K | $4K ??? | $2K |
| Lead time | 8 wks | 8 wks | |
| Misc | same firmware as SRVS | new model | MOTS may have test results (noise and full well based on sensor spec's only) |

Variations

There are many variations to the above specific embodiments of the present invention. Many of these will be obvious to those skilled in the art. As indicated above any number of telescopes could be used from one to several. The collected optical data could be imaged on a single sensor of a single high speed digital camera or more than one synchronized camera. Although the system is designed for rifle pointing, it could be adapted for any other uses where cross wind speeds are needed such as checking for dangerous wind speeds at airports. Some changes to the specified algorithms could be made without departing from the basic concepts of the invention. So the scope of the present invention should be determined by the appended claims and their legal equivalence.

What is claimed is:

1. A passive optical crosswind profiling system comprising:
   A) at least one telescope defining two apertures separated at a distance and adapted to collect light along at least two separate paths from a field of view containing a target,
   B) at least one high-speed digital camera defining at least one many pixel sensor wherein pixels of said at least one many pixel sensor are identified as separate blocks of pixels,
   C) an optical system for focusing light collected along said at least two separate paths by said at least one telescope onto said at least one many pixel sensor to produce at least two images of the target scene,
   D) a high-speed computer processor programmed to with a special block matching correlation algorithm to correlate image data collected the separate blocks of pixels in order to determine time required for horizontal and/or vertical shifts of blocks of images caused by air turbulence producing spatially-varying tilts and/or phase gradients in images detected by at least two of the separate blocks of pixels across the apertures of the at least one telescope to calculate a crosswind profile at multiple locations along a path between said system and said target.

2. The system as in claim 1 wherein said blocks of pixels comprise about 20×20 pixels per block.

3. The system as in claim 1 wherein said at least one sensor comprises at least 512×512 million pixels to define at least 625 blocks of pixels.

4. The system as in claim 1 wherein said computer processor is adapted to determine a spatial-temporal correlation of the local horizontal and vertical shifts of the blocks of the images caused by air turbulence.

5. The system as in claim 4 wherein said processor is programmed to determine crosswind speeds along the path from shifts of peaks of cross-correlation information and directions of the shift where the ray trajectories of sets of two cross-paths intercept.

* * * * *